(12) United States Patent
Tokita et al.

(10) Patent No.: US 6,890,096 B2
(45) Date of Patent: May 10, 2005

(54) ELECTRONIC CLINICAL THERMOMETER

(75) Inventors: Muneo Tokita, Kyoto (JP); Satoshi Nakajima, Kyoto (JP); Shigeru Makita, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/120,297

(22) Filed: Apr. 9, 2002

(65) Prior Publication Data
US 2002/0150143 A1 Oct. 17, 2002

(30) Foreign Application Priority Data
Apr. 11, 2001 (JP) ........................................ 2001-113224

(51) Int. Cl.$^7$ .......................... G01K 17/00; G01K 1/00; G01K 7/00; A61B 5/00
(52) U.S. Cl. ........................ 374/163; 374/29; 374/100; 600/474; 600/549; 702/131
(58) Field of Search ........................ 374/100, 163–164, 374/166, 121, 165, 170, 29, 44, 134; 600/474, 549; 702/131

(56) References Cited

U.S. PATENT DOCUMENTS

| | | | | |
|---|---|---|---|---|
| 4,183,248 A | * | 1/1980 | West | |
| 4,416,553 A | * | 11/1983 | Huebscher | |
| 4,569,355 A | * | 2/1986 | Bitterly | 600/504 |
| 4,793,553 A | * | 12/1988 | Berman | |
| 5,017,018 A | * | 5/1991 | Iuchi et al. | |
| 5,040,541 A | * | 8/1991 | Poppendick | |
| 5,169,235 A | * | 12/1992 | Tominaga et al. | |
| 5,352,039 A | * | 10/1994 | Barral et al. | |
| 5,464,284 A | * | 11/1995 | Rall | |
| 5,487,607 A | * | 1/1996 | Makita et al. | |
| 5,645,349 A | * | 7/1997 | Fraden | 374/120 |
| 6,149,297 A | * | 11/2000 | Beerwerth et al. | |
| 6,195,581 B1 | * | 2/2001 | Beerwerth et al. | |
| 6,219,573 B1 | * | 4/2001 | Pompei | |
| 6,221,025 B1 | * | 4/2001 | Skoletsky | 600/504 |
| 6,248,126 B1 | * | 6/2001 | Lesser et al. | 607/113 |
| 6,270,252 B1 | * | 8/2001 | Siefert | 374/102 |
| 6,280,397 B1 | * | 8/2001 | Yarden et al. | 600/549 |
| 6,605,038 B1 | * | 8/2003 | Teller et al. | 600/300 |
| 6,694,174 B2 | * | 2/2004 | Kraus et al. | 600/474 |
| 2001/0002918 A1 | * | 6/2001 | Tatoh | 374/179 |
| 2001/0027274 A1 | * | 10/2001 | Pompei | |
| 2004/0059212 A1 | * | 3/2004 | Abreu | 600/373 |
| 2004/0076215 A1 | * | 4/2004 | Baumbach | 374/29 |
| 2004/0133081 A1 | * | 7/2004 | Teller et al. | 600/300 |

FOREIGN PATENT DOCUMENTS

| | | | | |
|---|---|---|---|---|
| FR | 2.133.664 | | 12/1972 | |
| FR | 2305720 | * | 10/1976 | 374/164 |
| GB | 2134266 | * | 8/1984 | 374/54 |
| JP | 56118630 A | * | 9/1981 | |
| JP | 58211610 A | * | 12/1983 | |
| JP | 61076926 A | * | 4/1986 | |
| WO | 98/50766 | | 11/1998 | |
| WO | 01/31305 | | 5/2001 | |

* cited by examiner

*Primary Examiner*—Gail Verbitsky
(74) *Attorney, Agent, or Firm*—Beyer Weaver & Thomas LLP

(57) ABSTRACT

An electronic clinical thermometer has a probe including a temperature sensor and a heat flux sensor which are controlled to make measurements at specified time intervals. The measured values are used in solving the equation of heat conduction to estimate the temperature of an internal body position. A heater may be included to preheat a body part in order to reduce the time required for measurement. The probe may use two temperature sensors to measure temperatures at two body surface positions through insulating members which are different in thermal conductivity.

15 Claims, 15 Drawing Sheets

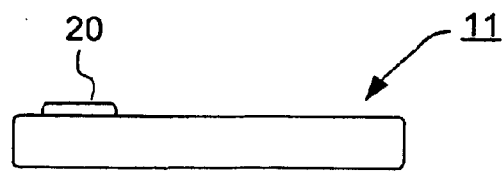
FIG. 8A
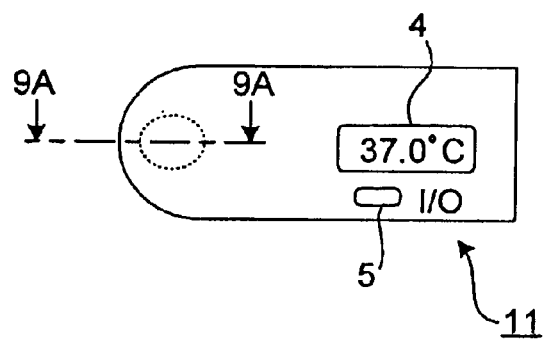
FIG. 8B
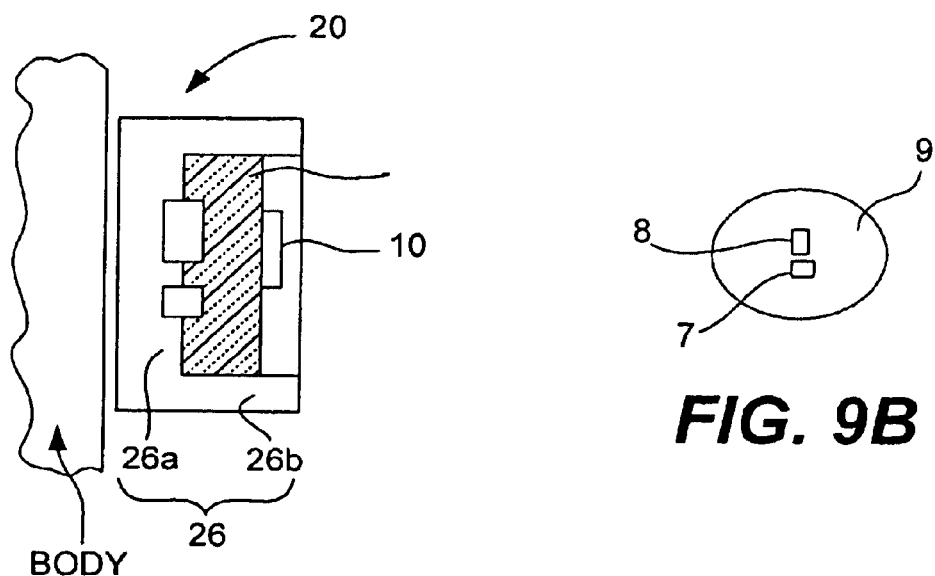
FIG. 9A
FIG. 9B

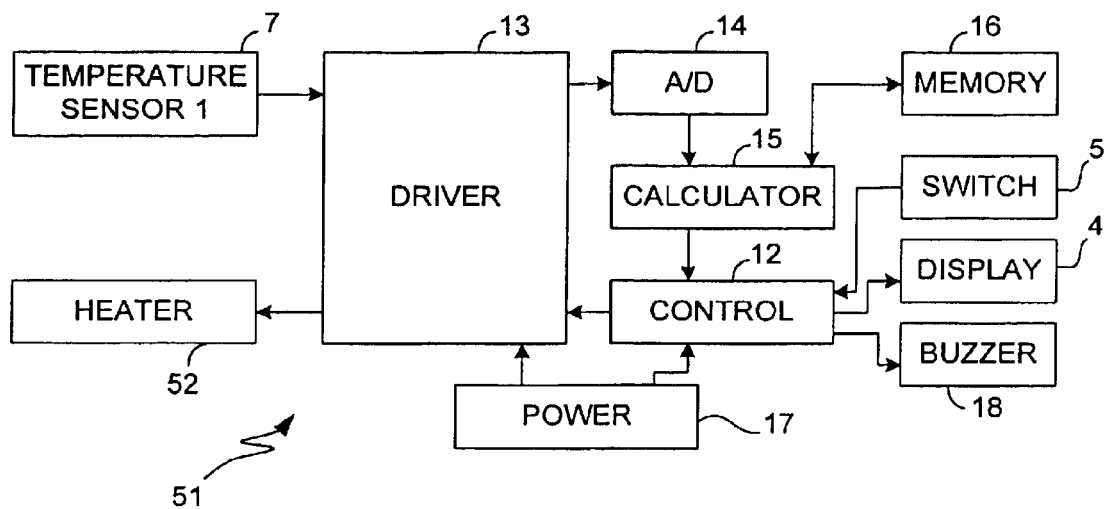
FIG. 23
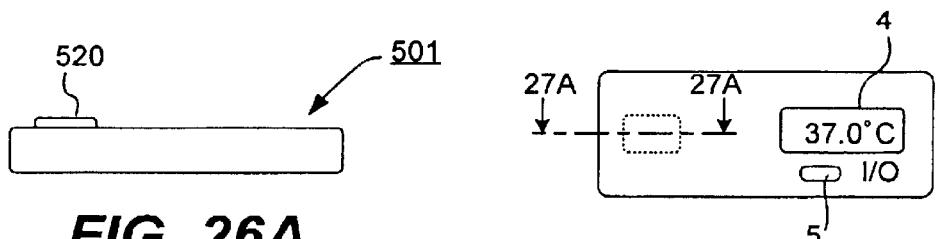
FIG. 26A          FIG. 26B
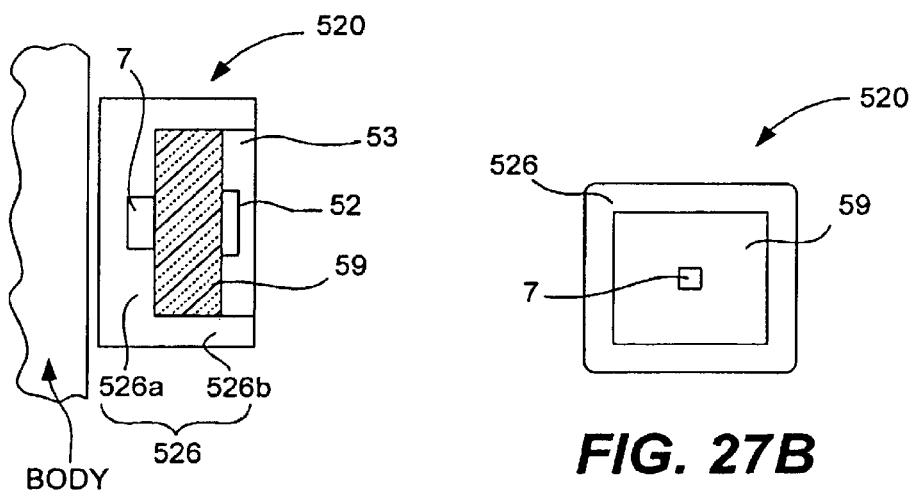
FIG. 27A          FIG. 27B

ELECTRONIC CLINICAL THERMOMETER

BACKGROUND OF THE INVENTION

This invention relates to an electronic thermometer for estimating the temperature at an inner position of a live body based on temperature data taken on the body surface. More particularly, the invention relates to such an electronic thermometer using an equation of thermal conduction for making such an estimate.

When a conventional clinical thermometer such as a mercury thermometer is used to measure the temperature of a body by having it held under an arm or the tongue, the thermometer must be kept in that position until a thermal equilibrium is reached between the internal body position of interest and the surface temperature.

Japanese Patent Publication Tokko Hei 7-119656 B2 disclosed a method of using an equation for estimating the change in temperature while reaching an equilibrium and regarding such an equilibrium temperature as the body temperature.

It is desirable, however, to measure the internal body temperature of a patient directly. International Patent Publication WO-9850766 disclosed an electronic thermometer based on the method published in "Engineering of Heat Conduction" (at page 90) by Masahiro Shoji (published by Tokyo University). According to this method, temperatures are measured at two different positions and the temperature at a third position outside the region of the two positions is estimated. What is desired, however, is an electronic thermometer for measuring not a surface temperature but an inner temperature.

If the measurement cannot be taken until a thermal equilibrium is reached between the surface and inner temperatures, it takes as long as 10 minutes until the measurement can be taken. This wait time can be reduced by a method of estimating the inner temperature from the manner in which temperature changes to reach the equilibrium, but it still takes about 90 seconds. This method cannot fully take into account individual variations among patients or environmental changes.

As for the method according to International Patent Publication WO-9850766, the solution is unstable because the equation to be solved is non-linear and an accurate solution cannot be obtained without the help of a high-power computer, and a long computer time will be wasted.

SUMMARY OF THE INVENTION

It is therefore an object of this invention to provide an electronic clinical thermometer capable of accurately and quickly estimate the internal body temperature of a live body by measuring real-time external temperature values directly and calculating the temperature at the desired internal body position by solving an equation of thermal conduction and using the results of such measurements.

In view of the above and other objects of this invention, the temperature on an external surface of a live body is measured directly on real time according to this invention and the body temperature at a normally inaccessible internal position of the body is estimated on the basis of values thus obtained. For this purpose, an equation of thermal conduction is used in reverse, Such an equation is solved as a lower-order equation such as a first-order differential equation including measurable physical quantities such as the body surface temperature and the thermal flux as variables. The desired internal temperature is then estimated by directly measuring these physical quantities. If as many different measured quantities are obtained as there are variables, the internal temperature can be obtained accurately and quickly by solving simultaneous first-order equations.

An electronic clinical thermometer embodying this invention may be characterized as comprising a temperature sensor for measuring temperature, a heat flux sensor disposed proximally to the temperature sensor for measuring heat flux at nearly the same position (so as to be substantially under the same thermal condition) where the temperature sensor measures temperature, a controller for controlling the temperature sensor and the heat flux sensor to make measurements with them at a specified time interval, a memory for storing values measured by the temperature sensor and the heat flux sensor, and a calculator for calculating estimated temperature at a specified internal body position from the measured values of temperature and heat flux.

In order to solve the equation of thermal conduction in reverse to estimate the temperature at a specified internal body position, various physical quantities may be selected for measurement. According to this invention, temperature and heat flux at approximate the same places are selected as the physical quantities for this purpose. By measuring these physical quantities for a plurality of times at a specified interval, or specified intervals, different sets of measured quantities can be obtained, and these obtained quantities can be used to solve the equation of thermal condition and estimate the target temperature at the specified internal position of a body. In the above, the heat flux sensor is a device for measuring the quantity of heat which flows through a unit area per unit time and includes devices that calculate the heat flux from other physical quantities.

It is advantageous to place the temperature and heat flux sensors proximally to each other such that the thermometer can be made compact. If the sensor part including these sensors can be made compact, its heat capacity is reduced, and since quicker changes in temperature can be generated, the time required for the measurement can be reduced.

It is also preferable to dispose the temperature and heat flux sensors on a thermally insulating member because the effects of heat movement not from the body being measured can thus be eliminated or at least reduced such that the signal-to-noise ratio can be improved.

In some embodiments of the invention, a heater is provided in the thermometer. If the temperature difference is great between the target body for measurement and the environmental temperature, for example, the temperature of the part of the body through which heat travels from the internal target position to the sensors may be heated by the heater such that measurements can be taken with the temperature differences inside the body reduced. In this manner, the temperature changes inside the body become stabilized and more accurate measurements become possible. The time required for the measurement can also be reduced. If a thermally insulating member is introduced between the heater and the sensors, a stable heat gradient can be formed between the heater and the sensors such that the temperature and heat flux sensors are placed in a more suitable temperature condition for the measurement and hence that more accurate measurements are possible.

Another thermometer embodying this invention may be characterized as having two (first and second) temperature sensors each for measuring temperature, a first thermally insulating member disposed between the first temperature sensor and a target body to be measured, a second thermally insulating member having a different thermal conductivity and being disposed between the second temperature sensor and the target body, a controller for controlling these temperature sensors to make measurements at specified time intervals, a memory for storing first measured values obtained by the first temperature sensor and second measured values obtained by the second temperature sensor, and a calculator for calculating estimated temperature at a specified internal body position from the first and second measured values. In this embodiment, the physical quantities to be measured are temperatures at two different points contacting thermally insulating members having different thermal conductivity values. If these physical quantities are measured at specified intervals and different sets of measured values are obtained, they can be used to solve the equations for thermal conduction and to calculate the temperature of an internal target position inside the body. Other physical quantities such as coefficient of thermal conduction and specific heat may be measured. Two insulating members with same conductivity may be used if, for example, they are different in thickness. In a thermometer according to this embodiment of the invention, too, it may be advantageous to include a heater for reasons described above.

Still another electronic clinical thermometer embodying this invention may be characterized as comprising a constant-temperature heater to be kept at a specified temperature, a temperature sensor for measuring temperature, a controller for controlling the temperature sensor and the constant-temperature heater to make measurements at specified time intervals, a memory for storing the specified temperature and measured values obtained by the temperature sensor, and a calculator for calculating estimated temperature at a specified internal body position from the specified temperature and the measured values. The constant-temperature heater in this case is used to prepare a body part which is heated thereby and stays at this specified temperature. It is possible to thus solve the equation of heat conduction by measuring the temperature at another body position.

In all these thermometers according to different embodiments of this invention, a probe may be formed for making contact to a body part in a planar shape or in an elongated shape of a bar such that even an infant can easily keep it in position in a stable manner.

BRIEF DESCRIPTION OF THE DRAWINGS

FIG. 8A is a side view and FIG. 8B is a bottom view of another electronic thermometer embodying this invention.

FIG. 9A is a sectional view of the probe taken along line 9A—9A of FIG. 8B and FIG. 9B is a plan view of the insulating member in the probe shown in FIG. 8A.

FIG. 23 is a block diagram for showing the circuit structure of the thermometer of FIG. 22.

FIG. 26A is a side view and FIG. 26B is a bottom view of a thermometer according to the fifth embodiment of the invention.

FIG. 27A is a sectional view taken along line 27A—27A of FIG. 26B, and FIG. 27B is a bottom view of the insulating layers of the thermometer of FIG. 27A.

Throughout herein some of like components are indicated by the same numerals although they may be components of different thermometers and may not be described repetitiously for the sake of simplicity of description.

DETAILED DESCRIPTION OF THE INVENTION

Figure 1:
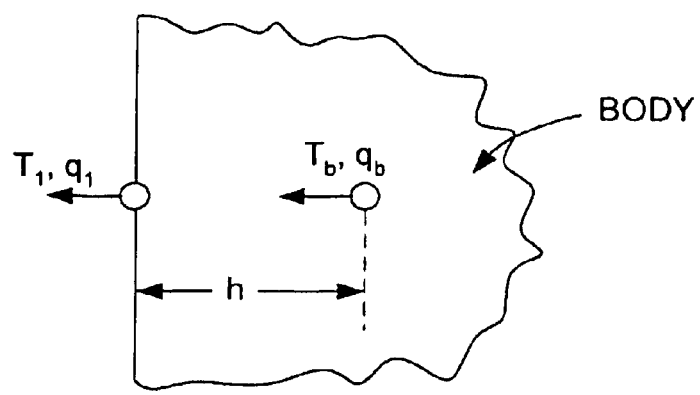
FIG. 1 is a sectional view of a portion of a patient's body for explaining the principle of heat conduction.

The invention is described next by way of examples. FIG. 1 shows $T_b$ as the temperature at an internal position of a patient to be estimated and $T_1$ as the temperature at an externally exposed body surface position, separated from the target position by a distance of h. The heat conductivity of the body is expressed as $\lambda$. If the flux of heat flow at the surface position is $q_1$, it may be expressed as follows:

$$q_1 = -\lambda(dT_1/dx) = -\lambda(T_1 - T_b)/h$$

where x represents the direction of the line connecting the internal target body position and the surface position where the surface body temperature and the heat flux are measured. (In FIG. 1, $q_b$ indicates the heat flux at the internal body position.) From the above, one obtains:

$$T_b = T_1 + (h/\lambda) q_1 \quad (1)$$

and this means that if two or more sets of values for $T_1$ and $q_1$ are measured, the value of $T_b$ can be estimated.

The basic differential equation for heat conduction (or the heat transfer equation) may be written as follows:

$$\partial T_1/\partial t = \alpha (\partial^2 T_1/\partial x^2)$$

where $\alpha$ is the thermal diffusivity. If the second-order term is included in its solution, this gives:

$$T_b = T_1 + (h/\lambda) q_1 + (h^2/2\alpha)(dT_1/dt) \quad (2)$$

since $q_1 = -\lambda(dT_1/dx)$. This means that if three or more sets of values for $T_1$, $q_1$ and $dT_1/dt$ are measured, the value of $T_b$ can be estimated.

If the equation is of zeroth-order, the temperature at an internal body position can be estimated by a minimum of one measurement because there is no need to take in account any change with time. By making measurement for a plurality of times, accurate results can be obtained even by using a zeroth-order equation. If a higher-order equation is used, even more accurate estimates become possible.

In the above, the surface temperature $T_1$ on the patient's body can be measured by means of a temperature sensor, and the heat flux can be measured by means of a heat flux sensor. Examples of a practically usable temperature sensor include IC temperature sensors using temperature characteristics such as platinum resistors, thermistors, thermo-couples and transistors. Examples of a heat flux sensor include layered structures and thermopiles.

Figure 2:
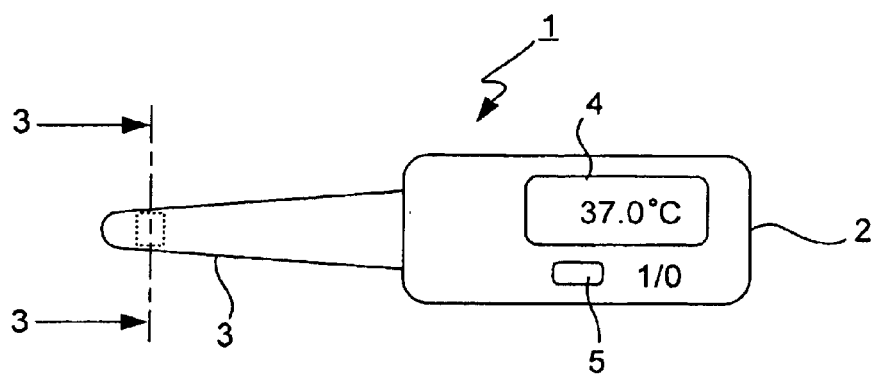
FIG. 2 is an external plan view of an electronic thermometer embodying the invention.
Figure 3:
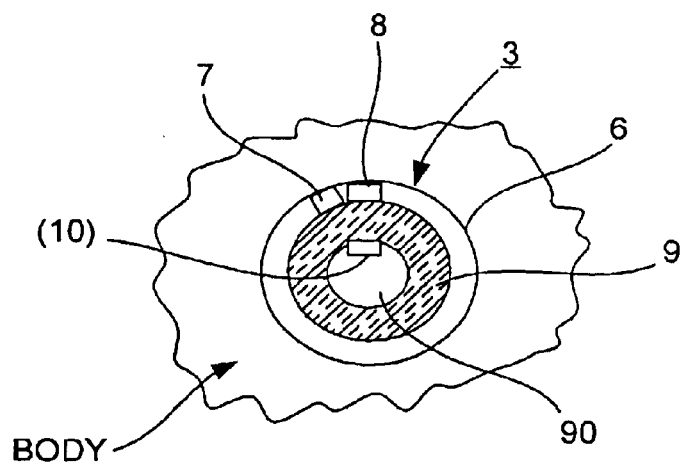
FIG. 3 is a sectional view of the thermometer of FIG. 2 taken along line 3—3.

FIG. 2 shows an electronic thermometer 1 according to a first embodiment of the invention comprising a main body 2 which is approximately in the shape of a rectangular parallelepiped and a probe 3 which protrudes longitudinally in the shape of a bar from the main body 2 such that the user may hold the main body 2 to insert the probe under an arm or under the tongue. The main body 2 contains a display device 4 such as an LCD for displaying data such as a measured value and a power switch 5. The probe 3 is approximately circular in cross-section, as shown in FIG. 3, and its outer surface is covered with a thin material 6 such as SUS having a high thermal conductivity. On the inner surface of this cover material 6, a temperature sensor 7 and a heat flux sensor 8 are disposed proximally to each other. The entire inner surface of this cover material 6 is covered with a layer of a thermally insulating member 9. A heater 10 is disposed on the inner surface of this insulating layer 9 according to a second embodiment of the invention. The aforementioned first embodiment of the invention assumes the absence of this heater 10.

The temperature sensor 7 and the heat flux sensor 8 are preferably disposed as closely as possible to each other so as to be at the same temperature. If they are insulated from each other, they may be disposed in contact with each other. The insulating layer 9 is hollow, surrounding an empty space 90 inside. Lead lines (now shown) from the temperature sensor 7 and the heat flux sensor 8 may be passed therethrough to the main body 2. The insulating layer 9 may be provided in the form of a film such that lead lines can be extended to the main body 2 along the baseboard for the film. A thin membrane of a resin material such as acryl, nylon, polyimides, polyesters and polyethylene may be used as the insulating member 9. The probe 3 can be made compact if the temperature sensor 7 and the heat flux sensor 8 can be disposed close to each other. If the temperature sensor 7 and the heat flux sensor 8 are disposed close to each other, furthermore, the overall volume of the probe 3 and its thermal capacity can be reduced such that this has the favorable effect of speeding up the response to a temperature change and hence of reducing the time required to complete the measurement. Moreover, the freedom of design choice is also improved. Since the temperature sensor 7 and the heat flux sensor 8 are disposed on an insulating layer 9, effects on temperature and heat flux due to heat from the target body can be reduced or eliminated, and the signal-to-noise ratio of the sensor can be improved for higher precision measurements.

Figure 4:
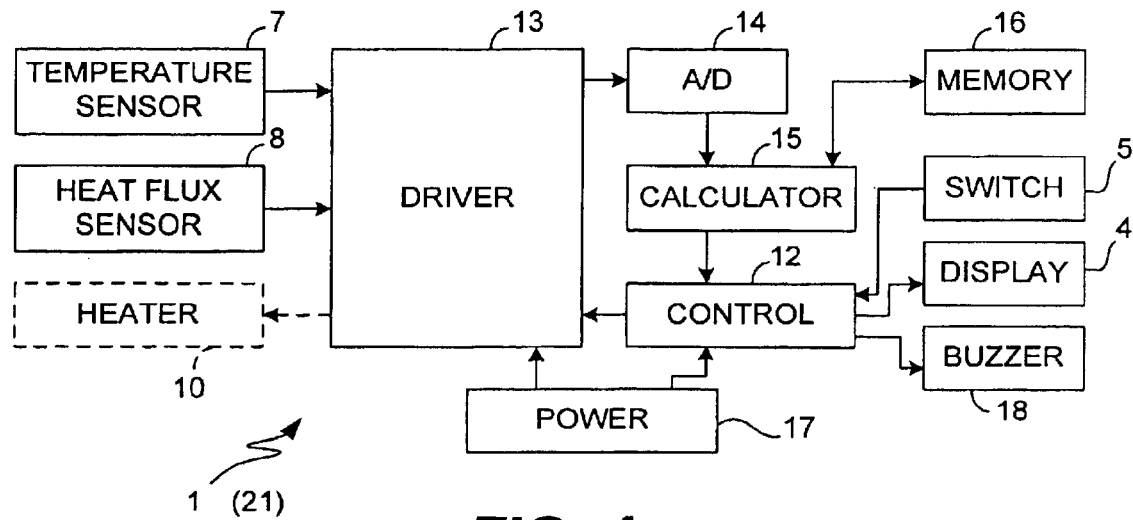
FIG. 4 is a block diagram for showing the circuit structure of the thermometer of FIG. 2.

As shown in FIG. 4, the electronic thermometer 1 comprises a controller 12, a driver 13, an A/D converter 14, a calculator 15, a memory 16, a power source 17 and a buzzer 18, in addition to the aforementioned temperature sensor 7, heat flux sensor 8, the power source 5 and the display device 4. The controller 12 comprises a CPU and serves to control the thermometer as a whole. The driver 13 is for driving the temperature sensor 7 and the heat flux sensor 8 on the basis of signals received from the controller 12. Signals outputted from the driver 13 are converted into digital signals by the A/D converter 14 and inputted to the calculator 15. The calculator 15 performs various calculations such as for estimating the temperature of an internal target body position on the basis of the digital signals received from the A/D converter 14 and/or measured temperature and heat flux values stored in the memory 16, and outputs the results of its calculations to the controller 12. In short, the calculator 15 serves to store specified data in the memory 16 and to retrieve data from the memory 16 to carry out specified calculations. The power source 17 may comprise a battery and serves to supply electric power to the controller 12 and the driver 13. The power switch 5 is for switching on and off the supply of power from the power source 17. The buzzer 18 is for generating a specified sound in response to a command from the controller 12 to alert the user of a certain situation. According to an embodiment where the heater 10 is provided, it is operated through the driver 13.

Figure 5:
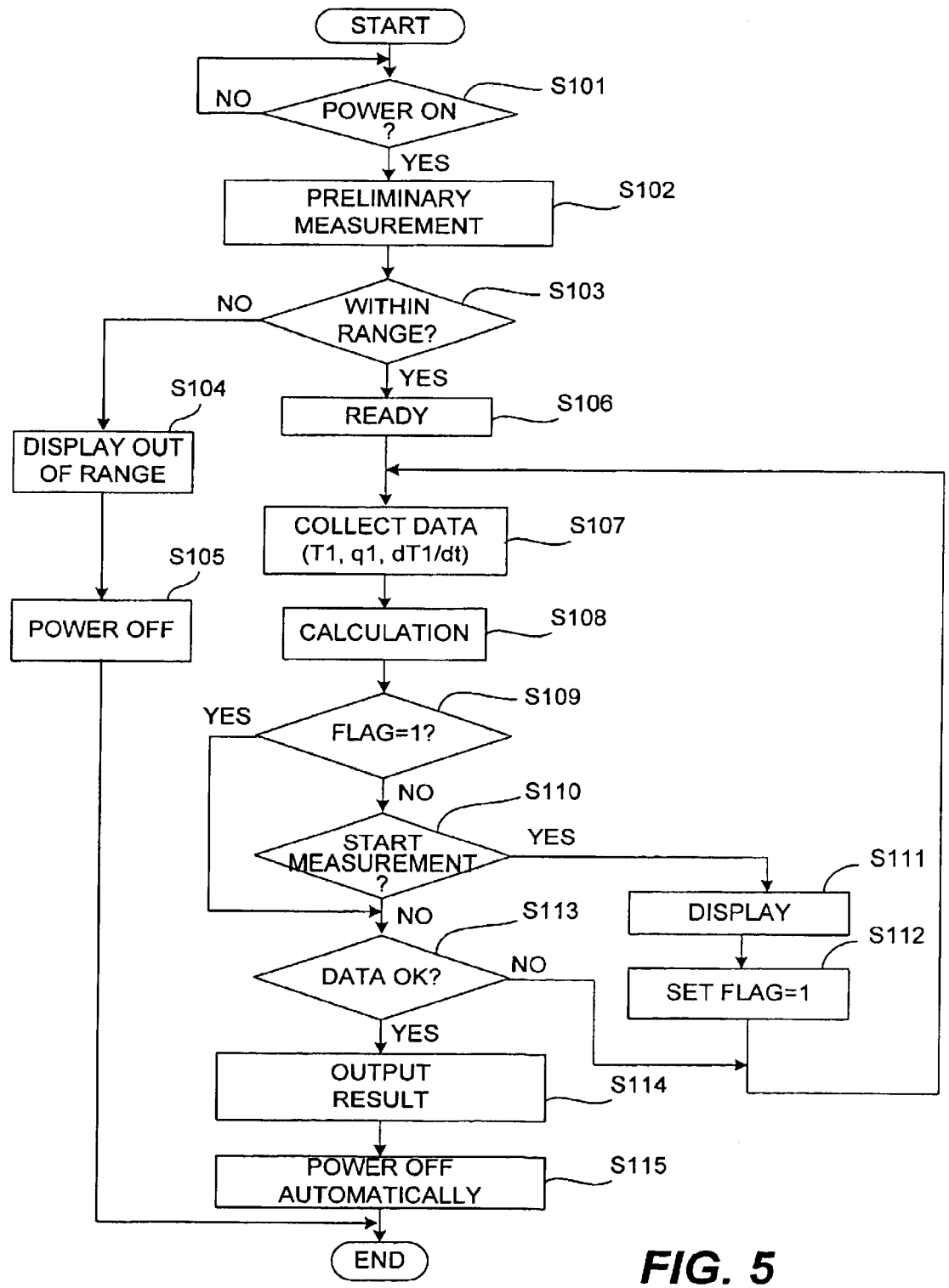
FIG. 5 is a flowchart of the process of taking a measurement by a thermometer according to a first embodiment of this invention.

FIG. 5 is referenced next to explain the process for measuring an internal body temperature. When the switch 5 is turned on (Step S101), a preliminary temperature measurement is taken by means of the temperature sensor 7 (Step S102) to determine whether or not this preliminarily obtained temperature is within a specified range (Step S103). If the measured temperature is not within the specified range (NO in Step S103), a display is made to this effect on the display device 4 (Step S104) and the power is switched off (Step S105).

Figure 6A:
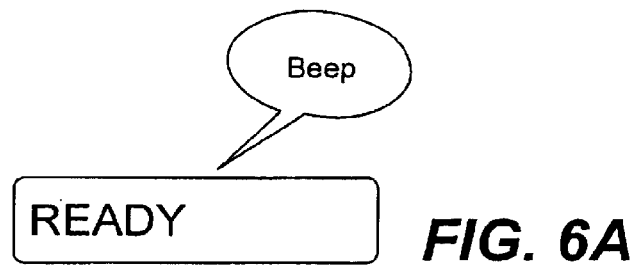
FIGS. 6A, 6B and 6C are examples of displays on the display device.

If the preliminarily measured temperature is within the specified range (YES in Step S103), a display is made to this effect on the display device 4 (Step S106) such as shown in FIG. 6A and the buzzer 18 may also be beeped to inform that the thermometer is ready to be used. Next, the temperature sensor 7 and the heat flux sensor 8 are operated through the driver 13 and values of $T_1$, $q_1$ and $dT_1/dt$ are collected (Step S107). These data are now used by the calculator 15 to estimate the temperature at an internal target position (Step S108).

Figure 6B:
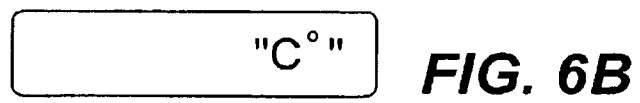

Next, the program checks to determine whether or not a start flag (to be explained below) is "1" or not (Step S109). If the start flag is "0" (NO in Step S109), it is checked whether or not a specified condition (to be explained below)

for starting the temperature measurement is satisfied (Step S110). If this condition is found to be satisfied (YES in Step S110), it is displayed on the display device 4 that a measurement is now being taken (Step S111). FIG. 6B shows an example of such a display, causing the symbol "° C." to blink. The start flag is then set to "1" (Step S112) and the program returns to Step S107.

Figure 6C:
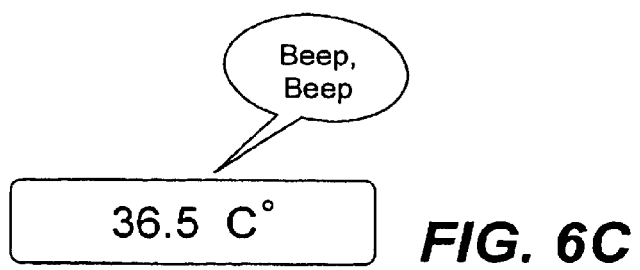

If the start flag is "1" in Step S109, it is checked (as will be explained in detail below) whether or not data that are sufficient for a measurement have been collected (Step S113). If sufficient data have not been collected (NO in Step S113), the program returns to Step S107 to repeat the collection of data. If sufficient data have been collected (YES in Step S113), the result of measurement is displayed on the display device 4, say, as shown in FIG. 6C and the buzzer 18 may be caused to beep twice to indicate that the result of measurement has been displayed (Step S114). Thereafter, power is automatically shut off (Step S115) after a wait period of a specified length of time (Step S115).

Figure 7:
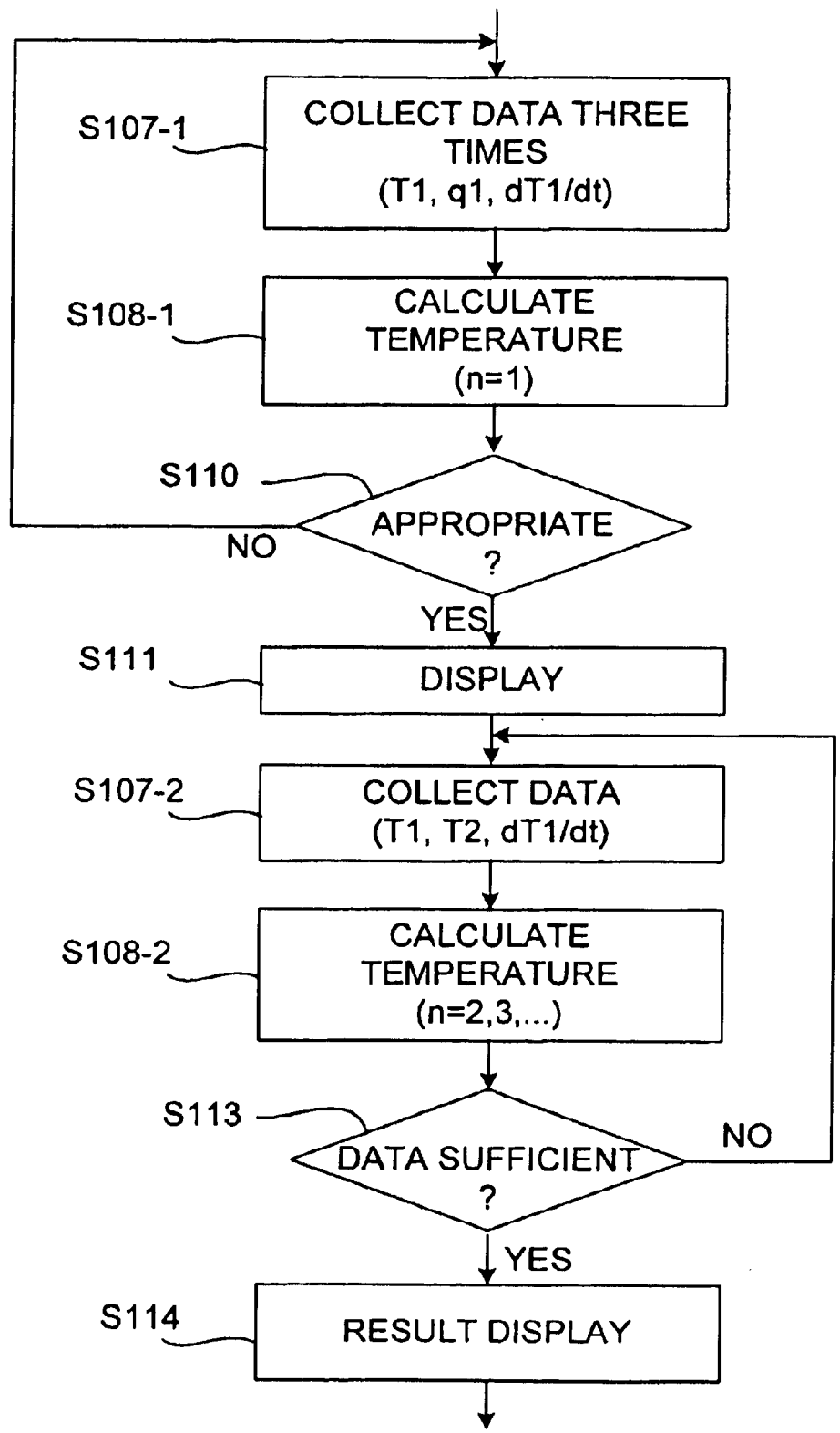
FIG. 7 is a portion of the flowchart of FIG. 5 shown more in detail.

The portion of the program explained above from Step S107 to Step S113 is shown more in detail in FIG. 7. After the display device 4 is caused to display that it is ready to take measurements, the values of $T_1$, $q_1$ and $dT_1/dt$ are measured three times (Step S107-1) and the calculation of the temperature at the target position is carried out for the first time (n=1) (Step S108-1). Since the start flag is still reset ("0") at this moment, the program proceeds to Step S110 and, as explained above, the measurement-starting condition is checked. The condition may be, for example, that the calculated temperature be within the range of 35–42° C. but this is not intended to limit the scope of the invention.

If the calculated temperature is not within such a specified range, or if the specified condition for starting measurement is not satisfied (NO in Step S110), the program proceeds to Step S113 (as shown in FIG. 5) and it is checked if data that are sufficient for a measurement have been collected. This judgment may be taken by examining whether or not a plurality of successively calculated temperature values are nearly the same (say, to the second positions below the decimal point). Since this is the first (n=1) calculation and there is no other result to compare to, it is concluded in Step S113 that sufficient data have not been collected and the program returns to Step 107 to repeat the collection of data. If the specified condition is satisfied in Step S110, the display as shown in FIG. 6B is made (Step S111) and the start flag is set to "1" (Step S112) as explained with reference to FIG. 5 and $T_1$, $q_1$ and $dT_1/dt$ are measured (Step S107-2) to calculate the temperature for the second time (Step S108-2). Since the start flag is set to "1", the program proceeds to Step S113 to check whether sufficient data have been collected. If not, the program returns to Step S107. If sufficient data have been collected, the result of the measurement is displayed (Step S114).

The determination whether data sufficient for measurement have been collected may be made by examining whether or not a plurality of consecutively calculated temperature values are, say, within 0.01° C. of one another.

FIGS. 8A and 8B show another electronic thermometer 11 which may be considered a variation of the first embodiment of the invention, structured in the shape of a flat rectangular parallelopiped with one end in a semi-circular form from which a probe 20 in the form of a circular column protrudes. A display device 4 comprising an LCD and a power switch 5 are disposed on the opposite surface.

As shown in FIG. 9A, the probe 20 has its upper and side surfaces covered with a thin cover layer 26, say, of SUS. A temperature sensor 7 and a heat flux sensor 8 are disposed on the lower surface of the top part 26a of the cover layer 26. A circular disk-shaped insulating member 9 is disposed below the top part 26a of the cover layer 26, sandwiching the temperature sensor 7 and the heat flux sensor 8 with the top part 26a of the cover layer 26. A heater 10 may be disposed (according to the second embodiment of the invention) on the lower surface of the insulating member 9. As shown in FIG. 9B, the temperature sensor 7 and the heat flux sensor 8 are positioned on the top part 26a of the cover layer 26 proximally to each other.

The thermometer 11 thus structured is particularly advantageous for use by an infant who may find it difficult to hold the probe steadily under an arm or under the tongue.

Next, the process of taking temperature measurement according to the second embodiment of the invention will be described with reference to FIG. 10. As briefly explained above, FIG. 4 also shows a thermometer 21 according to the second embodiment of the invention which is different from the thermometer 1 according to the first embodiment of the invention in that there is a heater 10 which is activated by a signal from the controller 12.

The purpose of the heater 10 in the thermometer 21 is to preheat the temperature sensor 7 and the heat flow sensor 8 so as to preliminarily reduce the initial difference between the temperature to be estimated at an internal target body position and those of the temperature sensor 7 and the heat flux sensor 8 such that the time required for the measurement can be reduced. The insulator layer 9 separating the heater 10 from the temperature sensor 7 and the flux sensor 8 allows them to be placed close together such that the probe 3 can be made compact and the temperature change can be stabilized for more accurate measurement.

Figure 10:
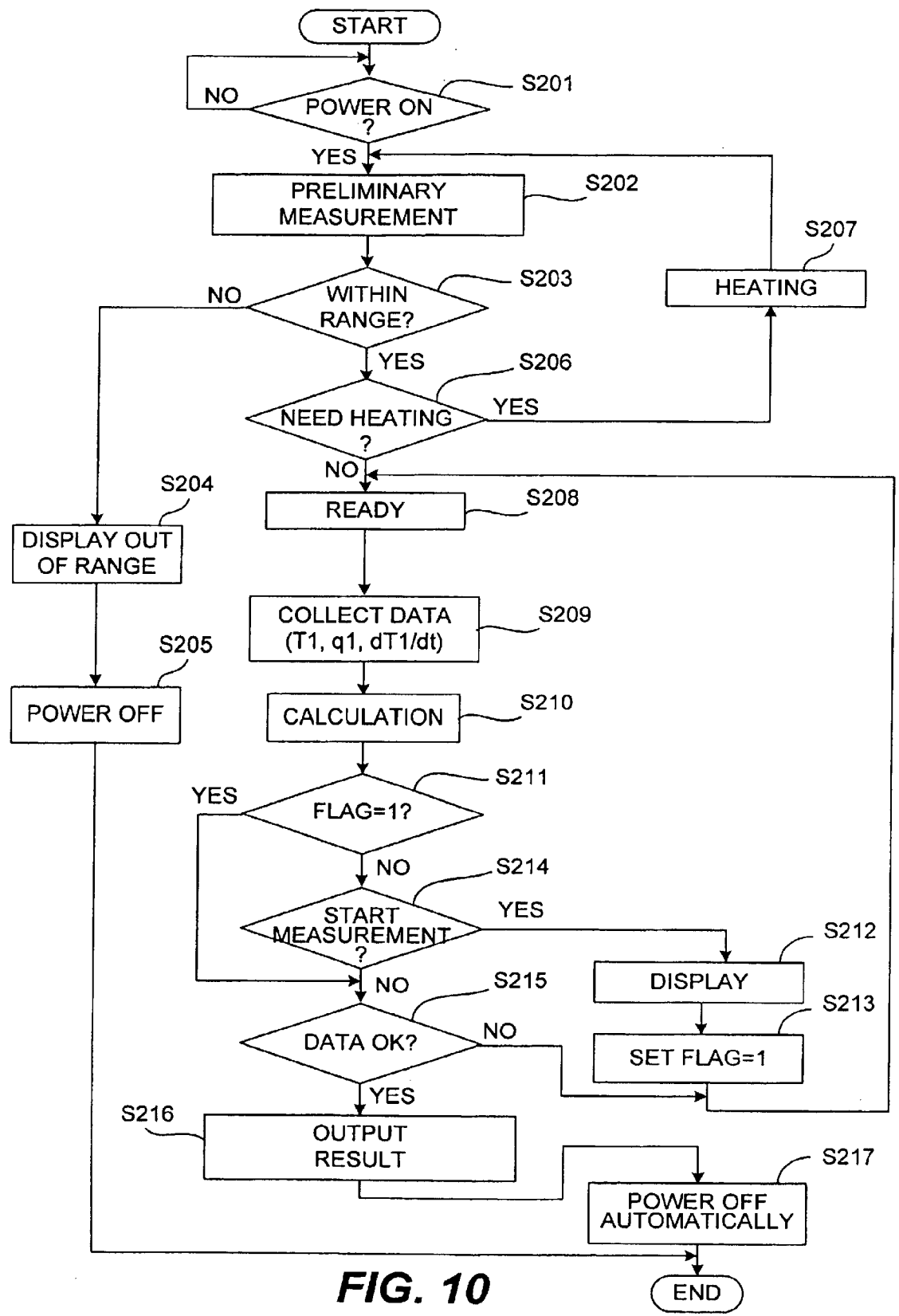
FIG. 10 is a flowchart of the process of taking a measurement by a thermometer according to a second embodiment of this invention.

In FIG. 10, Steps S201–S205 are the same respectively as Steps S101–S105 of FIG. 5 and hence will not be repetitiously explained. With this thermometer 21, however, it is determined in Step S206 whether or not a preheating is required on the basis of the temperature measured preliminarily in Step 202. Such preheating may be deemed necessary if the measured temperature is below a specified level such as 30° C.

If it is decided that a preheating is necessary (YES in Step S206), the heater 10 is activated (Step S207) until the measured temperature indicates that the preheating is no longer necessary (NO in Step S206), and then a "ready" display is made on the display device (Step S208). The processes from the end of Step S208 to Step S217 are the same as those from Step S106 to Step S115 shown in FIG. 5 and hence will not be repetitiously explained. It is to be noted that the heating by the heater 10 is finished before the measurement is taken and the heater 10 is not active during the measurement.

Figure 11:
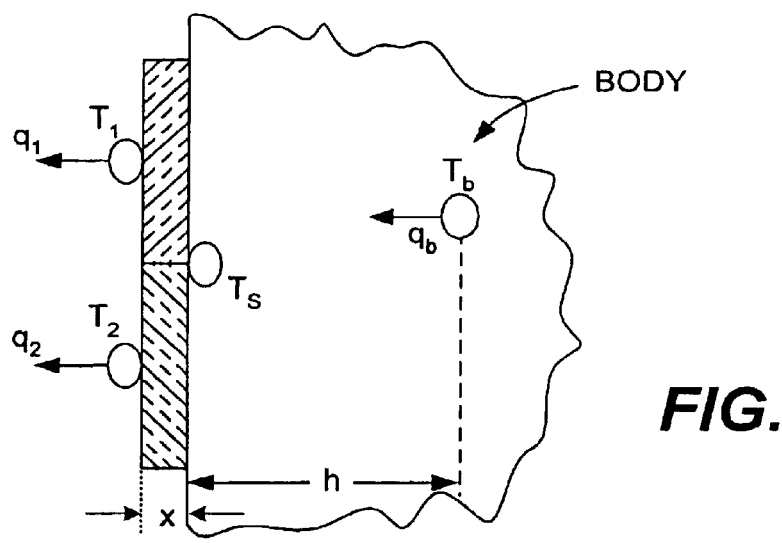
FIG. 11 is a sectional view of a portion of a patient's body for explaining the principle of body temperature measurement by a thermometer according to a third embodiment of this invention.
Figure 12:
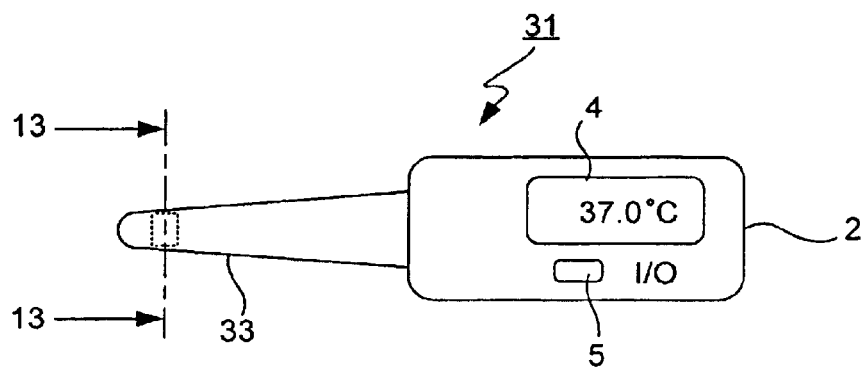
FIG. 12 is an external plan view of an electronic thermometer according to a third embodiment of the invention.
Figure 13:
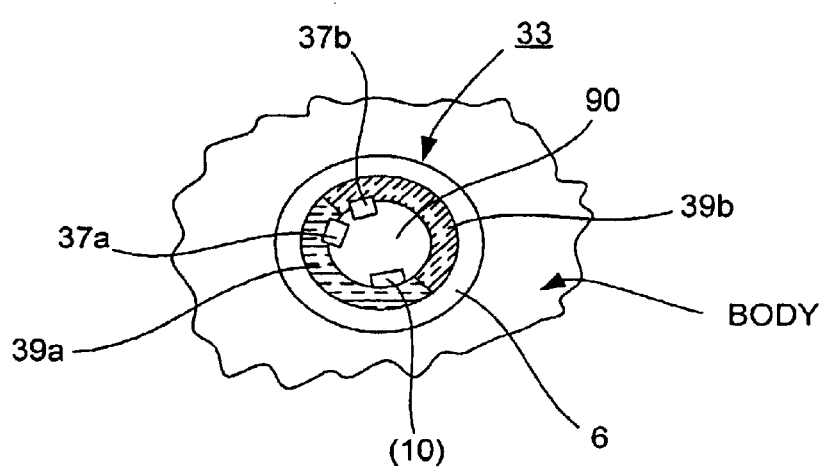
FIG. 13 is a sectional view of the thermometer of FIG. 12 taken along line 13—13.

FIG. 11 is referenced next to explain the principle of temperature measurement by a thermometer 31 according to a third embodiment of the invention shown in FIGS. 12 and 13.

The third embodiment is characterized as using two insulating members with different thermal conductivity values, or to estimate the temperature $T_b$ at an internal target body position by measuring temperatures $T_1$ and $T_2$ at different surface positions at a distance h from the target position respectively through an insulating layer with thermal conductivity $\lambda_1$ and $\lambda_2$. Thus, by solving the differential equation of thermal conduction by keeping the second-order terms as done above, we obtain:

$$T_b = T_{s1} + (h/\lambda_b)q_1 + (h^2/2\alpha_1)(dT_1/dt)$$

$$T_b = T_{s2} + (h/\lambda_b)q_2 + (h^2/2\alpha_2)(dT_2/dt)$$

where $\lambda_b$ is the thermal conductivity of the body, $T_{s1}$ and $T_{s2}$ are respectively the temperature at the contact surface between the body and the first and second insulating member, $q_1$ and $q_2$ are respectively the heat flux through the first and second insulating member, and $\alpha_1$ and $\alpha_2$ are respectively the thermal diffusivity of the first and second insulating member. Since we also have:

$$q_1 = -\lambda_1(dT_1/dx) = -\lambda_1(T_1 - T_{s1})/X$$

$$q_2 = -\lambda_2(dT_2/dx) = -\lambda_2(T_2 - T_{s2})/X$$

where X is the thickness of the insulating members, as shown in FIG. 11, we obtain simultaneous equations in the form of:

$$T_b = T_{s1} + A(T_{s1} - T_1) + B(dT_1/dt)$$

$$T_b = T_{s2} + C(T_{s2} - T_2) + D(dT_1/dt). \quad (3)$$

If the two temperature sensors are disposed close to each other and both insulating members are in contact with the body surface, $T_{s1} = T_{s2}$. Thus, by measuring $T_1$, $T_2$, $dT_1/dt$ and $dT_2/dt$, it is possible to estimate $T_b$. In summary, it is possible to estimate the temperature at an internal position of a live body by measuring the temperatures and the time rate of their changes at surface positions through insulating members having different thermal conductivity values.

Instead of using two different insulating members as explained above, use may be made of two insulating members which may have the same thermal conductivity but are different in thickness.

FIG. 12 shows an external view of a thermometer 31 according to the third embodiment of the invention. Since its external appearance is the same as that of the thermometer according to the first embodiment, the same symbols used in FIG. 2 are used for corresponding components and they are not repetitiously explained with reference to FIG. 12. FIG. 13 shows its internal structure. Its probe 33 is identical to the probe 3 shown in FIG. 3 except for the structure of the insulating member, having a first insulating layer 39a and a second insulating layer 39b with different thermal conductivity values disposed on the inner surface of the cover 6. A first temperature sensor 37a is on the inner surface of the first insulating layer 39a and a second temperature sensor 37b is on the inner surface of the second insulating layer 39b. A heater 10 may be disposed (according to a fourth embodiment of the invention) on the inner surface of either of the insulating layers 39a and 39b opposite the first and second temperature sensors 37a and 37b, separated therefrom across the hollow interior 90 of the insulating layers 39a and 39b. Lead lines (not shown) connected to the temperature sensors 37a and 37b may be extended through this hollow interior 90. Thermometers according to the third embodiment is advantageous in that they are less costly than the embodiments requiring the use of a heat flux sensor.

Figure 14:
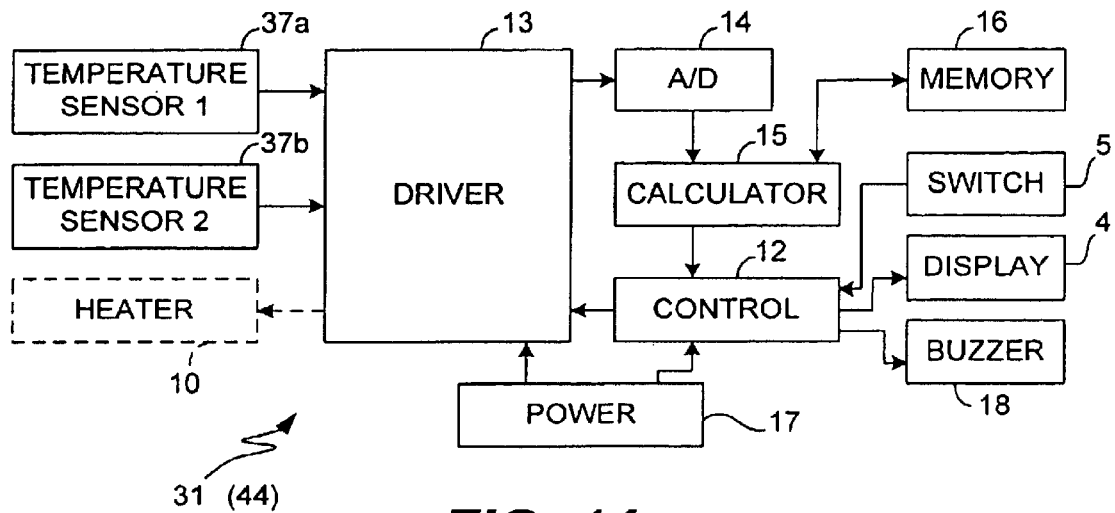
FIG. 14 is a block diagram for showing the circuit structure of the thermometer of FIG. 12.

FIG. 14 shows the internal circuit structure of the thermometer 31, which is similar to that shown by the block diagram of FIG. 4 except that the first and second temperature sensors 37a and 37b take the places of the temperature sensor 7 and the heat flux sensor 8 of FIG. 4.

Figure 15:
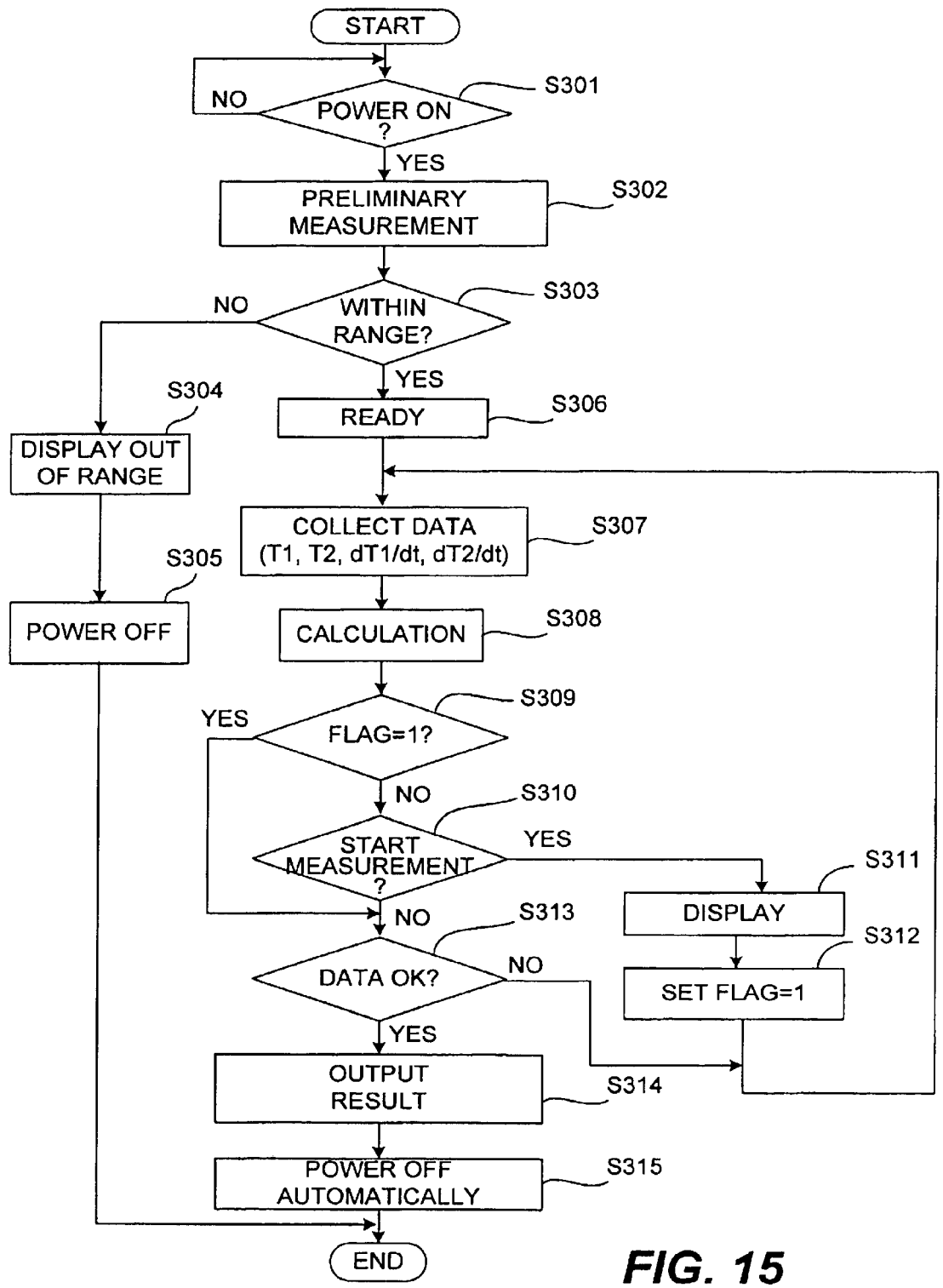
FIG. 15 is a flowchart of the process of taking a measurement by a thermometer according to a third embodiment of this invention.

FIG. 15 is referenced next to explain the process for measuring an internal body temperature. In FIG. 15, Steps S301–S305 and the step of shutting off the power (Step S315) are the same respectively as Steps S101–S105 and Step S115 of FIG. 5, and hence will not be repetitiously explained. With this thermometer 31, however, the first or second temperature sensor 37a or 37b is used in Step 302 for preliminarily measuring the temperature and four pieces of data $T_1$, $T_2$, $dT_1/dt$ and $dT_2/dt$ are collected in Step S307.

Figure 16:
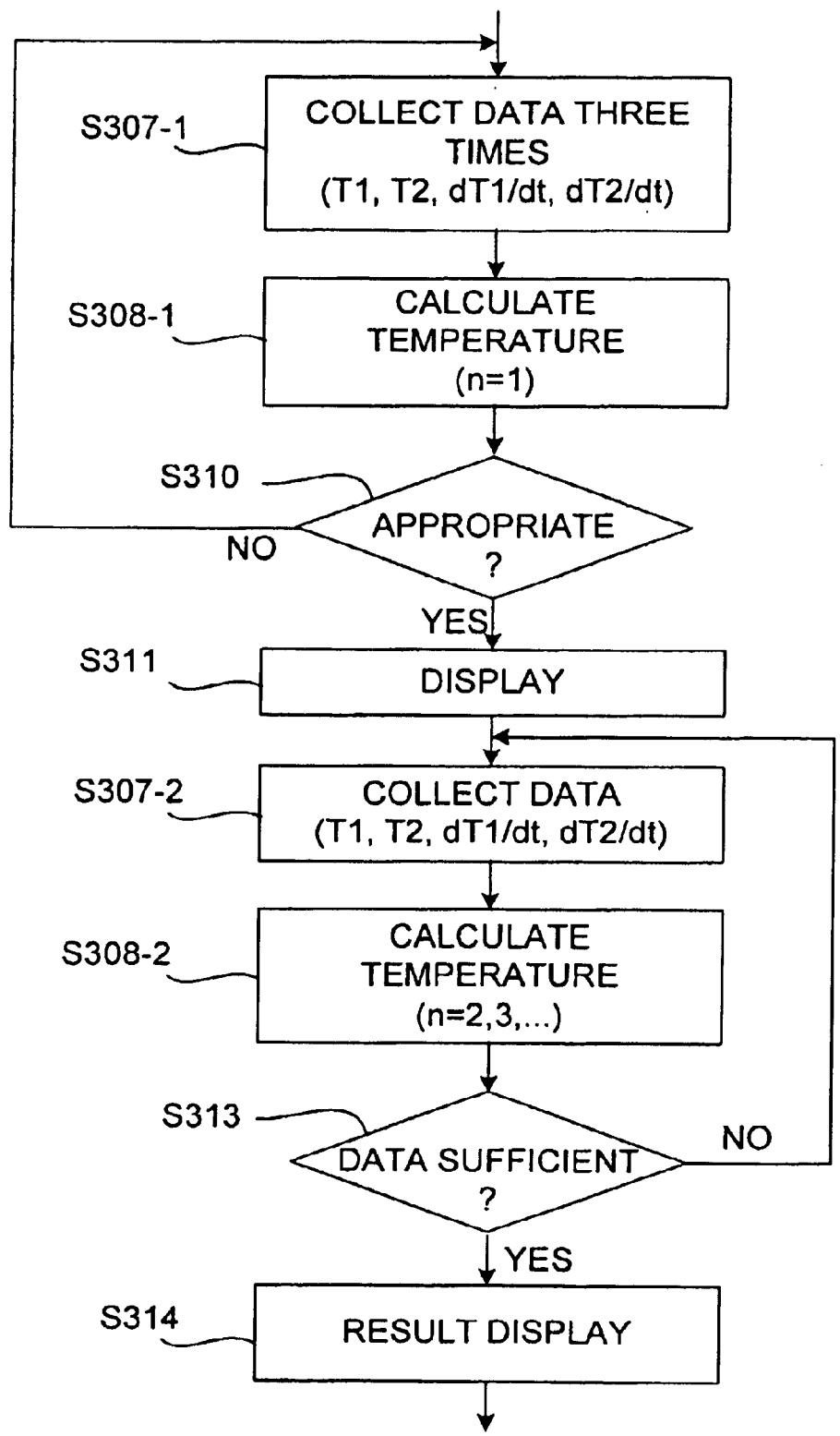
FIG. 16 is a portion of the flowchart of FIG. 15 shown more in detail.

FIG. 16 shows more in detail a portion of the flowchart of FIG. 15 from Step S307 to Step S313. This is similar to the portion explained above with reference to FIG. 7 except that four kinds of data $T_1$, $T_2$, $dT_1/dt$ and $dT_2/dt$ are collected in Steps S307-1 and S307-2 and since these four variables are to be obtained, that the data must be collected four or more times. As explained above, furthermore, the determination in Step S313 may be made by examining whether or not a plurality of consecutively calculated temperature values are, say, within 0.01° C. of one another.

Figure 17A:
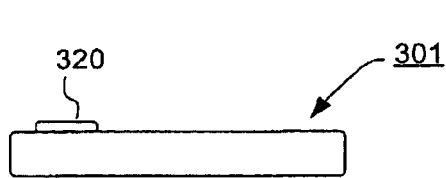
FIG. 17A is a side view and FIG. 17B is a bottom view of another thermometer according to the third embodiment of the invention.
Figure 17B:
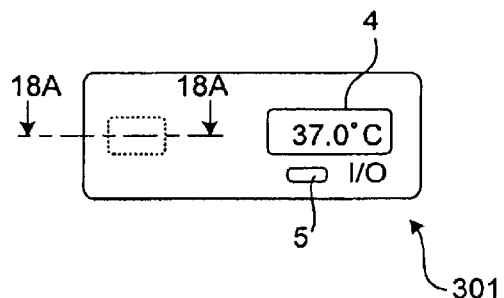
Figure 18A:
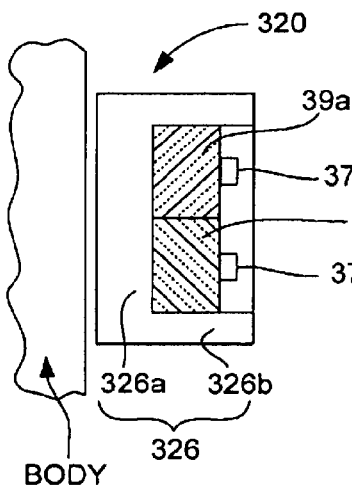
FIG. 18A is a sectional view taken along line 18A—18A of FIG. 17B.
Figure 18B:
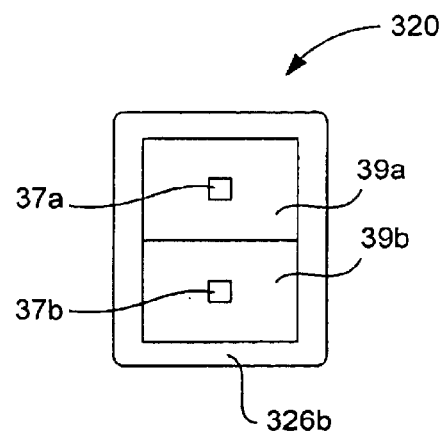
FIG. 18B is a bottom view of the insulating layers of the thermometer of FIG. 18A.

FIGS. 17A and 17B show another thermometer 301 which is a variation of the third embodiment, having a rectangular columnar probe 302 protruding at one end of one of its main surfaces and a display device 4 comprising an LCD and a power switch 5 disposed on the opposite surface. FIGS. 18A and 18B show the interior structure of the probe 302, having its top and side surfaces covered with a thin material 326 comprising SUS. Thermally insulating members 39a and 39b having different conductivity values are disposed adjacent each other below the top part 326a of the insulating member 326. The side wall portions of the insulating member 326 are indicated as 326b. The temperature sensors 37a and 37b are respectively disposed on the lower surface of the insulating members 39a and 39b. A heater (not shown) may also be disposed on the lower surface of either of the insulating members 39a and 39b (according to the fourth embodiment of the invention). This variation of the third embodiment is convenient for use by an infant who may find it difficult to hold the probe steadily under an arm or under the tongue.

FIGS. 13 and 14 also show a thermometer 41 according to the fourth embodiment of the invention, which is different from the third embodiment in that a heater 10 is included, adapted to be driven by a signal transmitted from the driver 13. The advantage of the fourth embodiment is that the heater 10 preheats the temperature sensors 37a and 37b and the insulating members 39a and 39b such that the time required for the temperature measurement can be reduced.

Figure 19:
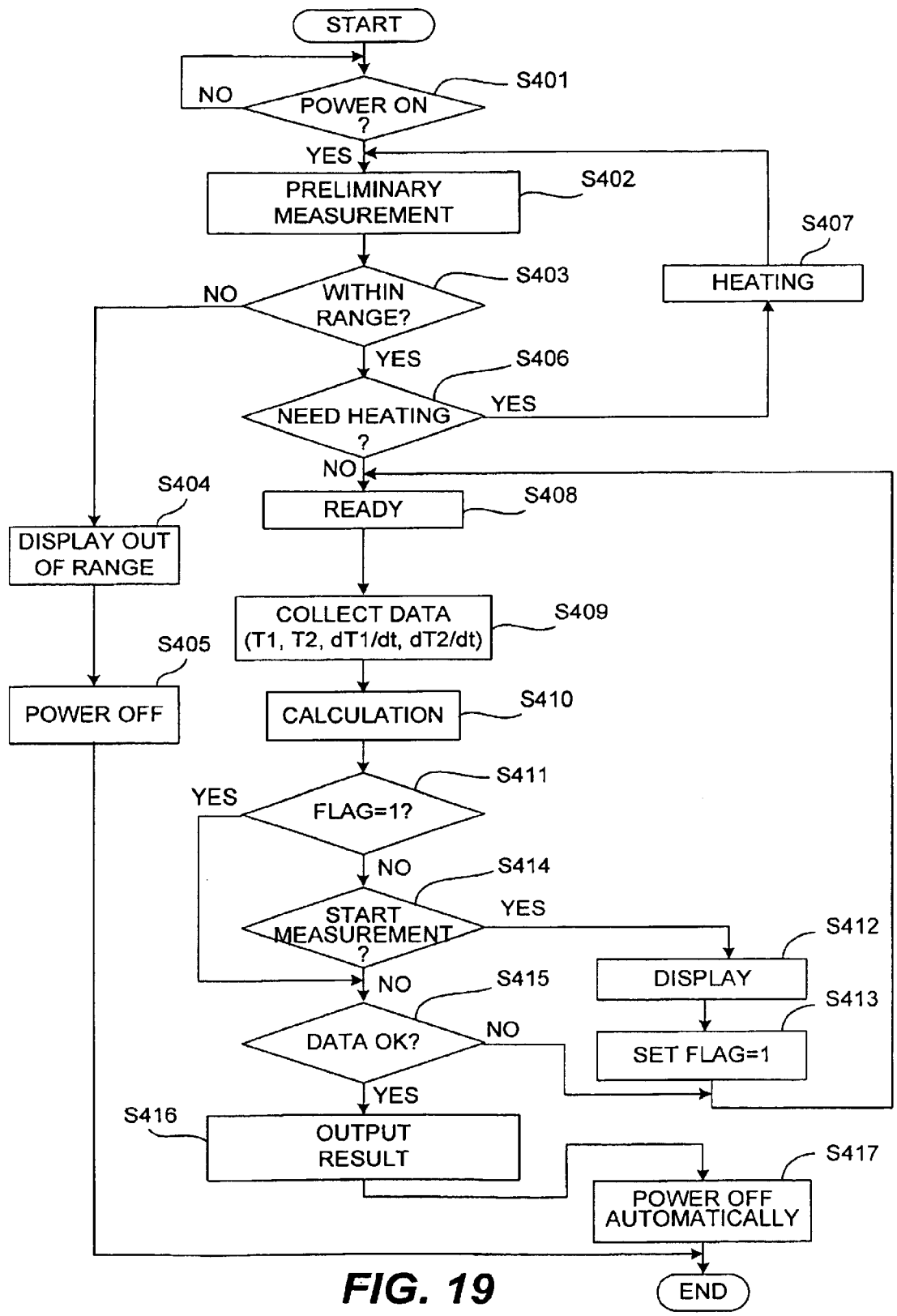
FIG. 19 is a flowchart of the process of taking a measurement by a thermometer according to a fourth embodiment of this invention.

FIG. 19 is referenced next to explain the process for measuring an internal body temperature by means of the thermometer 41 according to the fourth embodiment of the invention. In FIG. 19, Steps S401–S405 and Steps S408–S416 are the same respectively as Steps S101–S105 and Steps 106–115 of FIG. 5, hence will not be repetitiously explained. With this thermometer 41, however, it is determined in Step S406 whether or not a preheating is required on the basis of the temperature measured preliminarily in Step 402. Such preheating may be deemed necessary if the measured temperature is below a specified level such as 30° C. If it is determined in Step S406 that a preheating step is required, the heater 10 is activated for preheating (Step S407) as done in Step S207 with reference to FIG. 10.

Figure 20:
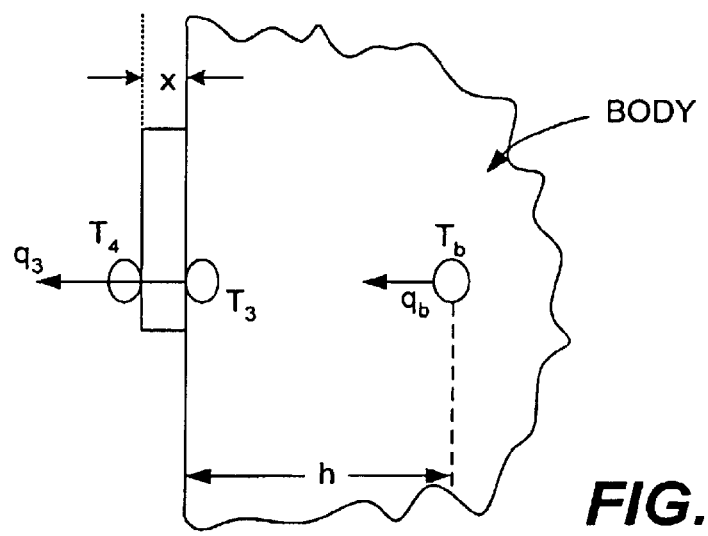
FIG. 20 is a sectional view of a portion of a patient's body for explaining the principle of body temperature measurement by a thermometer according to a fifth embodiment of this invention.
Figure 21:
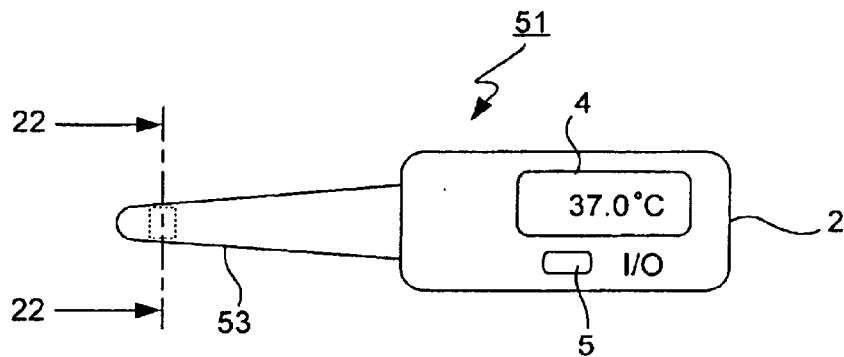
FIG. 21 is an external plan view of an electronic thermometer according to the fifth embodiment of the invention.
Figure 22:
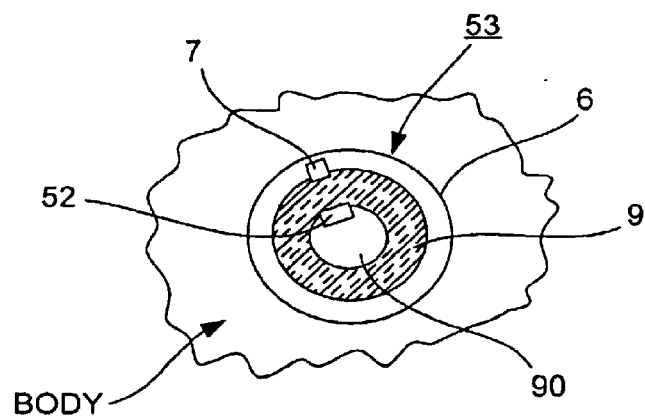
FIG. 22 is a sectional view of the thermometer of FIG. 21 taken along line 22—22 of FIG. 21.

FIG. 20 is referenced next to explain the principle of temperature measurement by a thermometer 51 according to a fifth embodiment of the invention shown in FIGS. 21 and 22.

The fifth embodiment is characterized as estimating the temperature $T_b$ at an internal target body position separated from a body surface by a distance of h by measuring the surface temperature $T_3$ detected by a temperature sensor in contact with the body surface and the specified temperature $T_4$ of a heater which contacts the body surface through a thermal insulator. If $\rho$ is the density of the insulator, c is its specific heat, X is its thickness, $\lambda$ is its thermal conductivity, $\lambda_b$ is the thermal conductivity of the body, $q_3$ is the heat flux through the insulator and $q_b$ is the heat flux through the body, one obtains from the conservation law:

$$\rho c X (dT_3/dt) = q_b - q_3 = -\lambda_b (dT_3/dx) + \lambda (dT_4/dx),$$

or $$dT_3/dt = \omega_1(T_b - T_3) - \omega_2(T_3 - T_4),$$

where $$\omega_1 = \lambda_b/\rho c X h, \text{ and}$$

$$\omega_2 = \lambda/\rho c X^2.$$

Thus, since $T_4$ is a known temperature, $T_b$ can be estimated by measuring two or more values of $dT_3/dt$ and $T_3$.

As shown in FIG. 21, the external view of the thermometer 51 is the same as that of the thermometer 1 according to the first embodiment shown in FIG. 2. The internal structure of its probe 53 is also similar to that of the thermometer 1 shown in FIG. 3 except that a temperature sensor 7 is disposed on the inner surface of the cover 6 and also that a thermally insulating member 9 is disposed so as to sandwich the temperature sensor 7 with the cover 6. The insulating member 9 is cylindrically formed with a hollow interior 90. A constant-temperature heater 52 is disposed on the inner surface of the insulating member 9 at a position opposite to the temperature sensor 7. Lead lines (not shown) connected to the temperature sensor 7 and the heater 52 are extended through this hollow interior 90.

As shown in FIG. 23, the interior circuit structure of the thermometer 51 is similar to that of the thermometer 1 shown in FIG. 4 except a constant-temperature heater 52 is provided to be driven by the driver 13 according to a signal outputted from the controller 12.

Where there is a significant difference between the body temperature and the environmental temperature, the medium through which heat flows from the internal target position in the body to the temperature sensor 7 is heated by the heater such that the temperature difference is reduced. In this manner, the temperature change of the probe 53 inclusive of the temperature sensor 7 becomes stabilized. Thus, an accurate measurement becomes possible and the time required for the measurement can be reduced. Another advantage of this embodiment is that the probe 53 is of a simpler structure, including essentially only the temperature sensor 7 and the constant-temperature heater 52 such that freedom of choice in positioning the components is improved. The presence of the insulating member 9 between the temperature sensor 7 and the heater 52 serves to create a stable temperature gradient such that the temperature sensor can be placed under a suitable temperature condition for the measurement.

Figure 24:
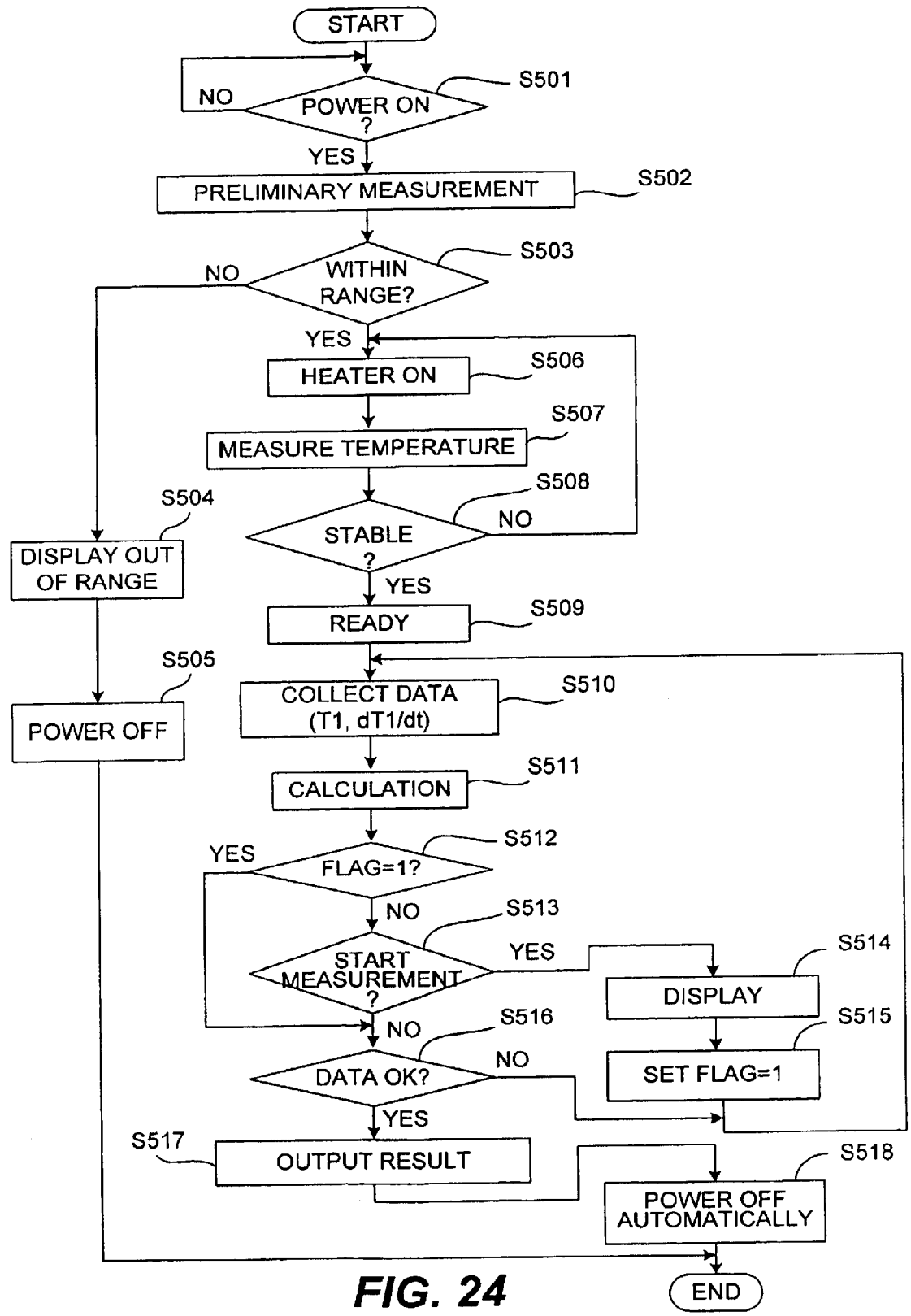
FIG. 24 is a flowchart of the process of taking a measurement by a thermometer according to the fifth embodiment of this invention.

FIG. 24 is referenced next to explain the process for measuring an internal body temperature by means of the thermometer 51 according to the fourth embodiment of the invention. In FIG. 24, Steps S501–S505 and Steps S510–S518 are the same respectively as Steps S101–S105 and Steps 107–115 of FIG. 5, hence will not be repetitiously explained. With this thermometer 51, however, the heater 51 is switched on (Step S506) and temperature is measured by the temperature sensor 7 (Step S507) if the temperature measured in Step S502 is within a specified range. If the temperature is not stable (NO in Step S508), the program returns to Step S506. If the temperature is stable (YES in Step S508), a display is made to the effect that it is ready to take a measurement (Step S509). In Step S510, unlike in Step S107, two kinds of data $T_1$ and $dT_1/dt$ are collected, and the heater 52 is not necessarily switched off while the data are collected. Since the purpose of the heater 52 is to remain at a constant temperature level, it may be intermittently switched on and off.

Figure 25:
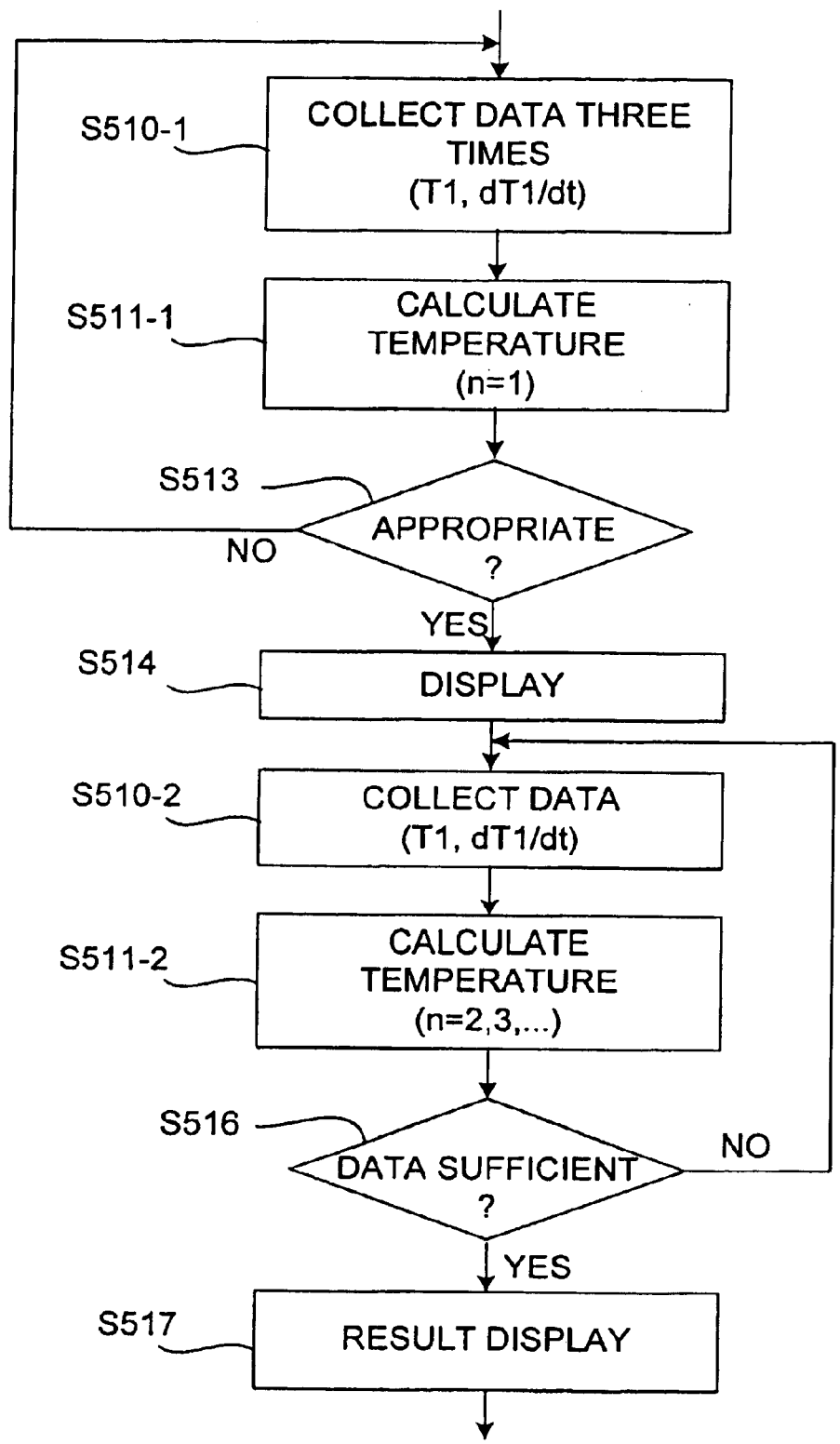
FIG. 25 is a portion of the flowchart of FIG. 24 shown more in detail.

The portion of the flowchart of FIG. 24 from Step S510 to Step S517 is shown in FIG. 25 more in detail. The processes from Step S510-1 to Step S517 are the same as explained above with reference to FIG. 7 except that two kinds of data $T_1$ and $dT_1/dt$ are collected in the present embodiment in Steps S510-1 and S510-2 and, since there are two variables $T_1$ and $dT_1/dt$ to be obtained, that data are collected at least twice. As explained above, furthermore, the determination in Step S516 may be made by examining whether or not a plurality of consecutively calculated temperature values are, say, within 0.01° C. of one another.

FIGS. 26A and 26B show another thermometer 501 which is a variation of the fifth embodiment, having a rectangular columnar probe 502 protruding at one end of one of its main surfaces and a display device 4 comprising an LCD and a power switch 5 disposed on the opposite surface. FIGS. 27A and 27B show the interior structure of the probe 502, having its top and side surfaces covered with a thin material 526 comprising SUS or the like. A temperature sensor 7 is disposed below the top portion 526a of the cover 526. The side wall portions of the insulating material 526 are indicated as 526b. A thermally insulating member 59 is disposed below the top portion 526a of the cover 526 so as to sandwich the temperature sensor 7 with the top portion 526a of the cover 526. A constant-temperature heater 52 is disposed in contact with the insulating member 59. There is a hollow space 53 between the insulating member 59 and the bottom part of the cover 526. This variation of the fifth embodiment is convenient for use by an infant who may find it difficult to hold the probe steadily under an arm or under the tongue.

With any of the electronic thermometers embodying this invention, the temperature at an internal target body position is calculated by making measurements on real time on the external surface of the body and by using the equation of thermal conduction. Thus, the measurements can be made accurately and quickly.

What is claimed is:

1. An electronic clinical thermometer comprising:

a temperature sensor for measuring temperature at a body surface position;

a heat flux sensor disposed proximally to said temperature sensor at said body surface position for measuring heat flux;

a controller for controlling said temperature sensor and said heat flux sensor to make measurements at a specified time interval;

a memory for storing measured values of said temperature and said heat flux; and a calculator for calculating estimated temperature at a specified internal body position by using a plurality of temperature values measured by said temperature sensor and heat flux values measured by said heat flux sensor.

2. The thermometer of claim 1 further comprising a thermally insulating member, said temperature sensor and said heat flux sensor being disposed on said insulating member.

3. The thermometer of claim 2 further comprising a heater disposed on said insulating member.

4. The thermometer of claim 2 further comprising a heater, said temperature sensor and said heat flux sensor together forming a probe, said probe containing said heater.

5. The thermometer of claim 1 further comprising a probe which is planar and contains said temperature sensor and said heat flux sensor.

6. The thermometer of claim 2 further comprising a probe which is planar and contains said temperature sensor and said heat flux sensor.

7. The thermometer of claim 3 further comprising a probe which is planar and contains said temperature sensor and said heat flux sensor.

8. The thermometer of claim 4 wherein said probe is planar and contains said temperature sensor and said heat flux sensor.

9. The thermometer of claim 1 further comprising a probe which is bar-shaped and contains said temperature sensor and said heat flux sensor.

10. An electronic clinical thermometer comprising:
- a temperature sensor for measuring temperature at a body surface position;
- a heat flux sensor disposed proximally to said temperature sensor at said body surface position for measuring heat flux;
- a controller for controlling said temperature sensor and said heat flux sensor to make measurements at a specified time interval;
- a memory for storing measured values of said temperature and said heat flux; and
- a calculator for calculating estimated temperature at a specified internal body position by using values measured by said temperature sensor and said heat flux sensor; and
- a thermally insulating member, said temperature sensor and said heat flux sensor being disposed on said insulating member.

11. The thermometer of claim 10 further comprising a heater disposed on said insulating member.

12. The thermometer of claim 10 further comprising a heater, said temperature sensor and said heat flux sensor together forming a probe, said probe containing said heater.

13. The thermometer of claim 10 further comprising a probe which is planar and contains said temperature sensor and said heat flux sensor.

14. The thermometer of claim 11 further comprising a probe which is planar and contains said temperature sensor and said heat flux sensor.

15. The thermometer of claim 12 wherein said probe is planar and contains said temperature sensor and said heat flux sensor.

* * * * *